US012366360B1

(12) United States Patent
Duranleau-Hendrickx et al.

(10) Patent No.: US 12,366,360 B1
(45) Date of Patent: Jul. 22, 2025

(54) GAS TURBINE ADAPTIVE SECONDARY FUEL FILLING PROFILE

(71) Applicant: Pratt & Whitney Canada Corp., Longueuil (CA)

(72) Inventors: Louis Duranleau-Hendrickx, Montreal (CA); Gabriel Meunier, Saint Bruno (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/649,715

(22) Filed: Apr. 29, 2024

(51) Int. Cl.
  *F23R 3/00* (2006.01)
  *F02C 7/28* (2006.01)
  *F23R 3/34* (2006.01)

(52) U.S. Cl.
  CPC .............. *F23R 3/346* (2013.01); *F02C 7/28* (2013.01); *F05D 2260/85* (2013.01)

(58) Field of Classification Search
  CPC ...... F02C 9/26; F02C 9/00; F02C 7/28; F02C 7/22; F02C 7/222; F02C 7/232; F23R 3/346; F05D 2260/85; F05D 2260/602; F23K 5/16; F23K 5/18; F23K 2301/203; F01D 25/002
  See application file for complete search history.

(56) References Cited

U.S. PATENT DOCUMENTS

| | | | |
|---|---|---|---|
| 6,536,217 B2 | 3/2003 | Lipinski et al. | |
| 6,681,556 B2 | 1/2004 | Mistry et al. | |
| 7,003,939 B1 | 2/2006 | Rackwitz et al. | |
| 10,072,578 B2 | 9/2018 | Chalaud | |
| 11,408,348 B2 | 8/2022 | Culwick | |
| 11,639,687 B2 | 5/2023 | Cirtwill et al. | |
| 2012/0192542 A1 | 8/2012 | Chillar et al. | |
| 2018/0163630 A1 | 6/2018 | Bickley et al. | |
| 2018/0163966 A1 | 6/2018 | Jones et al. | |
| 2020/0362769 A1* | 11/2020 | Jarvo | F02C 9/28 |
| 2021/0139158 A1* | 5/2021 | Tang | B64D 37/00 |
| 2023/0055438 A1* | 2/2023 | Dillon | F02C 9/40 |
| 2023/0057599 A1 | 2/2023 | Dillon et al. | |

* cited by examiner

*Primary Examiner* — Edwin Kang

(57) ABSTRACT

An apparatus comprises a combustion chamber of a gas turbine engine, a primary manifold for injecting fuel into the combustion chamber via a first plurality of nozzles and a secondary manifold for injection fuel into the combustion chamber via a second plurality of nozzles. A fuel control system provides fuel flow to the primary manifold and to the secondary manifold. The fuel control system determines at least one control parameter responsive to a first point at which the fuel flow level causes the secondary manifold to start draining and a second point at which an acceleration request is made and selects one of a plurality of secondary manifold filling profiles responsive to the determined at least one control parameter.

20 Claims, 10 Drawing Sheets

GAS TURBINE ADAPTIVE SECONDARY FUEL FILLING PROFILE

TECHNICAL FIELD

This disclosure relates generally to secondary manifold fuel filling profiles for gas turbine engines. More specifically, this disclosure relates to a system and method for adaptively selecting the secondary manifold fuel filling profile for gas turbine engines.

BACKGROUND

Gas turbine engines have primary manifolds and secondary manifolds that have fuel provided thereto during various states of engine operation. With respect to certain engine power levels, both manifolds supply fuel to a combustion chamber of the engine. When fuel flow is reduced below a certain value, the secondary manifold begins to drain expelling the remaining fuel into the combustion chamber or purging the fuel back to the fuel tank. If power levels to the engine are again increased before the secondary manifold has completely drained, and if the refilling process of the secondary manifold is too aggressive, it will force undrained fuel within the secondary manifold into the combustion chamber causing a risk of engine surge. Inversely, if the refilling process of the secondary manifold is too slow, the manifold will take time to fill, causing a noticeable delay in engine power response. Thus, in order to protect the engine from the risk of engine surge some manner for adaptively controlling the manner in which the secondary manifold is refilled when powering up from low-power situations is desirable.

SUMMARY

This disclosure provides methods and apparatus for adaptively selecting secondary manifold fuel manifold filling profiles.

In one embodiment, the apparatus also includes a combustion chamber of a gas turbine engine, a primary manifold for injecting fuel into the combustion chamber via a first plurality of nozzles and a secondary manifold for injection fuel into the combustion chamber via a second plurality of nozzles. A fuel control system provides fuel flow to the primary manifold and to the secondary manifold. The fuel control system determines at least one control parameter responsive to a first point at which a fuel flow level causes the secondary manifold to start draining and a second point at which an acceleration request is made and selects one of a plurality of secondary manifold filling profiles responsive to the determined at least one control parameter.

Implementations may include one or more of the following features. The apparatus where the fuel control system further detects when the fuel flow level causes the secondary manifold to start draining, detects when the acceleration request is made, determines a time between when the fuel flow level causes the secondary manifold to start draining and when the acceleration request is made and selects the one of the plurality of secondary manifold filling profiles responsive to the determined time. The fuel control system further detects when the fuel flow level causes the secondary manifold to start draining, detects when the acceleration request is made, determines an integrator area between the fuel flow level that causes the secondary manifold to start draining and between the actual fuel flow value, over the duration of time between the draining of the secondary manifold and when the acceleration request is made and selects the one of the plurality of secondary manifold filling profiles responsive to the determined integrator area. The plurality of secondary manifold filling profiles each have a different amplitude and different fuel rate. The plurality of secondary manifold filling profiles each have a different amplitude and a same fuel rate. The fuel control system further monitors a spool acceleration of the gas turbine engine during execution of the selected one of the plurality of secondary manifold filling profiles, determines if the spool acceleration of the gas turbine engine exceeds a threshold level and aborts the selected one of the plurality of secondary manifold filling profiles responsive to a determination that the spool acceleration of the gas turbine engine exceeds the threshold level. The fuel control system further dynamically generates the selected one of the plurality of secondary manifold filling profiles using an equation. The plurality of secondary manifold filling profiles are each associated with a predetermined value of the at least one control parameter. Implementations of the described techniques may include hardware, a method or process, or computer software on a computer-accessible medium.

In another embodiment, a method for controlling filling of a secondary manifold of a gas turbine engine includes providing fuel flow to a primary manifold and to the secondary manifold of the gas turbine engine using a fuel control system, determining at least one control parameter responsive to a first point at which a fuel flow level causes the secondary manifold to start draining and a second point at which an acceleration request of the gas turbine engine is made and selecting one of a plurality of secondary manifold filling profiles responsive to the determined at least one control parameter.

Implementations may include one or more of the following features. The method where the step of determining further may include detecting when the fuel flow level causes the secondary manifold to start draining, detecting when the acceleration request is made and determining a time between when the fuel flow level causes the secondary manifold to start draining and when the acceleration request is made. The method may include selecting the one of the plurality of secondary manifold filling profiles responsive to the determined time. The step of determining further may include detecting when the fuel flow level causes the secondary manifold to start draining, detecting when the acceleration request is made and determining an integrator area between when the fuel flow level causes the secondary manifold to start draining and when the acceleration request is made. The method may include selecting the one of the plurality of secondary manifold filling profiles responsive to the determined integrator area. The method may include monitoring a spool acceleration of the gas turbine engine during execution of the selected one of the plurality of secondary manifold filling profiles, determining if the spool acceleration of the gas turbine engine exceeds a threshold level and aborting the selected one of a plurality of secondary manifold filling profiles responsive to a determination that the spool acceleration of the gas turbine engine exceeds the threshold level. The step of selecting further may include dynamically generating the selected one of the plurality of secondary manifold filling profiles using an equation. The step of selecting further may include associating the plurality of secondary manifold filling profiles with a predetermined value of the at least one control parameter. Implementations of the described techniques may include hardware, a method or process, or computer software on a computer-accessible medium.

In a further embodiment, the apparatus also includes a combustion chamber of a gas turbine engine, a primary manifold for injecting fuel into the combustion chamber via a first plurality of nozzles and a secondary manifold for injection fuel into the combustion chamber via a second plurality of nozzles. A fuel control system provides fuel flow to the primary manifold and to the secondary manifold. The fuel control system further may include a timer associated with the fuel control system and a plurality of secondary manifold filling profiles each associated with a predetermined time value. The fuel control system initiates the timer when a fuel flow level causes the secondary manifold to start draining, stops the timer when an acceleration request is made, determines a time value between when the fuel flow level causes the secondary manifold to start draining and when the acceleration request is made responsive to a time measured by the timer and selects one of a plurality of secondary manifold filling profiles responsive to the determined time value.

Implementations may include one or more of the following features. The apparatus where the plurality of secondary manifold filling profiles each have a different amplitude and different fuel rate. The plurality of secondary manifold filling profiles each have a different amplitude and a same fuel rate. Implementations of the described techniques may include hardware, a method or process, or computer software on a computer-accessible medium.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 11, discussed below, and the various embodiments used to describe the principles of this disclosure in this patent document are by way of illustration only and should not be construed in any way to limit the scope of the disclosure. Those skilled in the art will understand that the principles of this disclosure may be implemented for any suitably arranged engine inspection apparatus.

Figure 1:
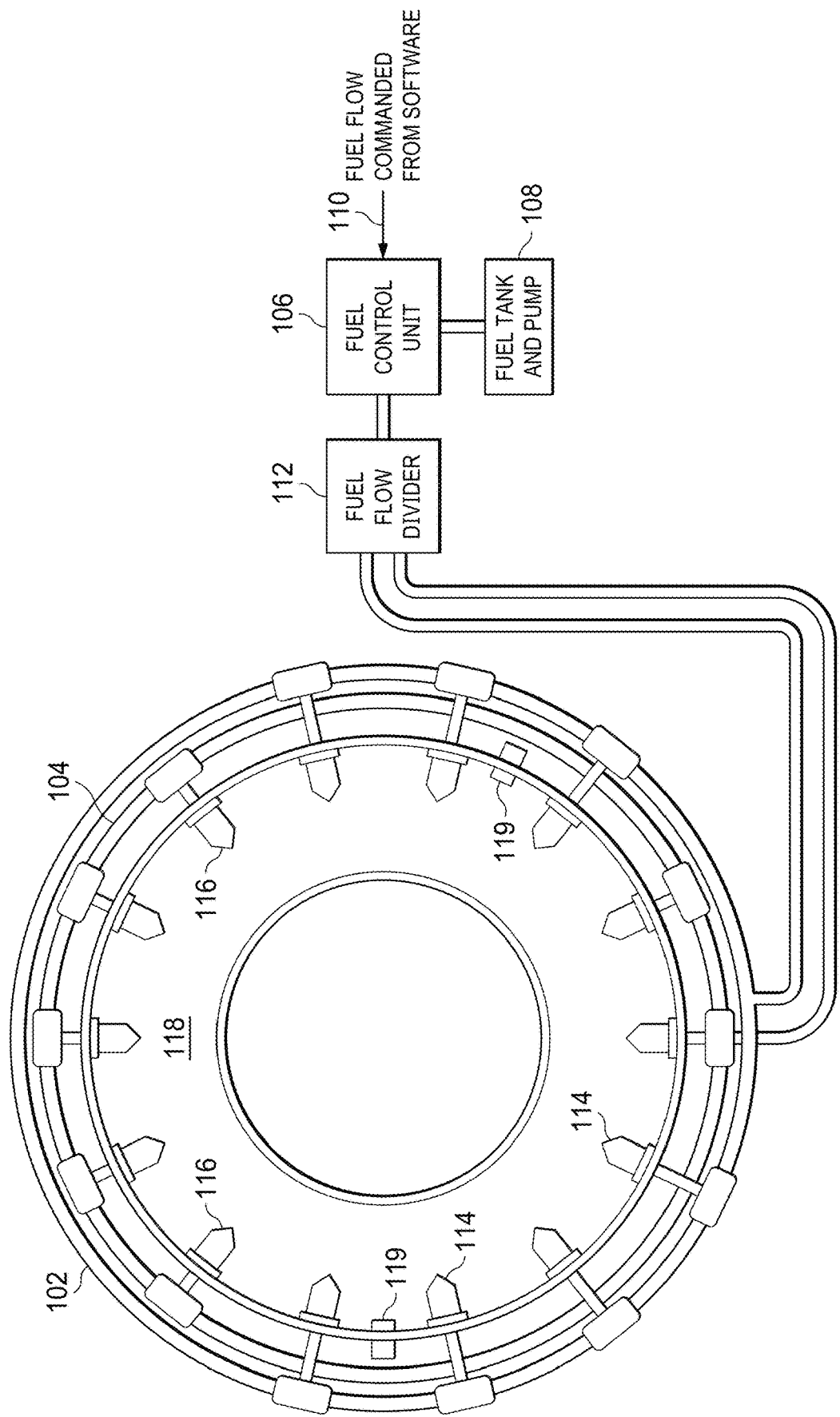
FIG. 1 illustrates a schematic diagram of the control mechanism for a gas turbine engines primary and secondary manifolds.

FIG. 1 illustrates a schematic diagram of a gas turbine engine's primary manifold 102 and secondary manifold 104. The fuel control unit (FCU) 106 meters fuel flow from a fuel tank 108 in accordance with fuel flow commands received at input 110 from control software or control unit. The FCU 106 sends fuel to the fuel flow divider 112 that divides fuel flow between the primary manifold 102 and the secondary manifold 104. At low fuel flow (or fuel pressure), the fuel flow divider 112 only sends fuel to the primary manifold 102 that supplies the primary fuel nozzles 114 having smaller passages in the nozzles to better atomize the fuel even at low pressures. The low fuel flow mode is used during engine starting on many engine models. Above a certain fuel flow (or fuel pressure), the fuel flow divider 112 also starts to send fuel to the secondary manifold 104 that supplies the secondary fuel nozzles 116 having larger passages to supply enough fuel flow at higher engine power. Above a certain power, both the primary manifold 102 and the secondary manifold 104 supply fuel to their respective nozzles. The fuel flow divider 112 can be a mechanical device consisting of valves and springs or an electronic actuator (e.g. solenoid valve) controlled by the engine control software. When fuel flow (or pressure) is reduced below a certain value during, for example, a shutdown or deceleration to low power, the secondary manifold 104 begins to drain by either expelling the remaining fuel into the combustion chamber 118 or purging the fuel back into the fuel tank 108.

Manifold filling sequences are used extensively on gas turbines during engine start with the objective to quickly fill the previously drained fuel in the secondary manifold 104 so that when the fuel flow divider 112 later opens the fuel flow to the secondary manifold there will be no delay in engine response since the secondary manifold is already full. The conventional manifold filling sequence is a high amplitude fuel spike/pulse of a relatively short duration. During an engine start, the secondary manifold 104 is always fully drained so that the same open-loop manifold filling sequence can always be used.

Figure 2:
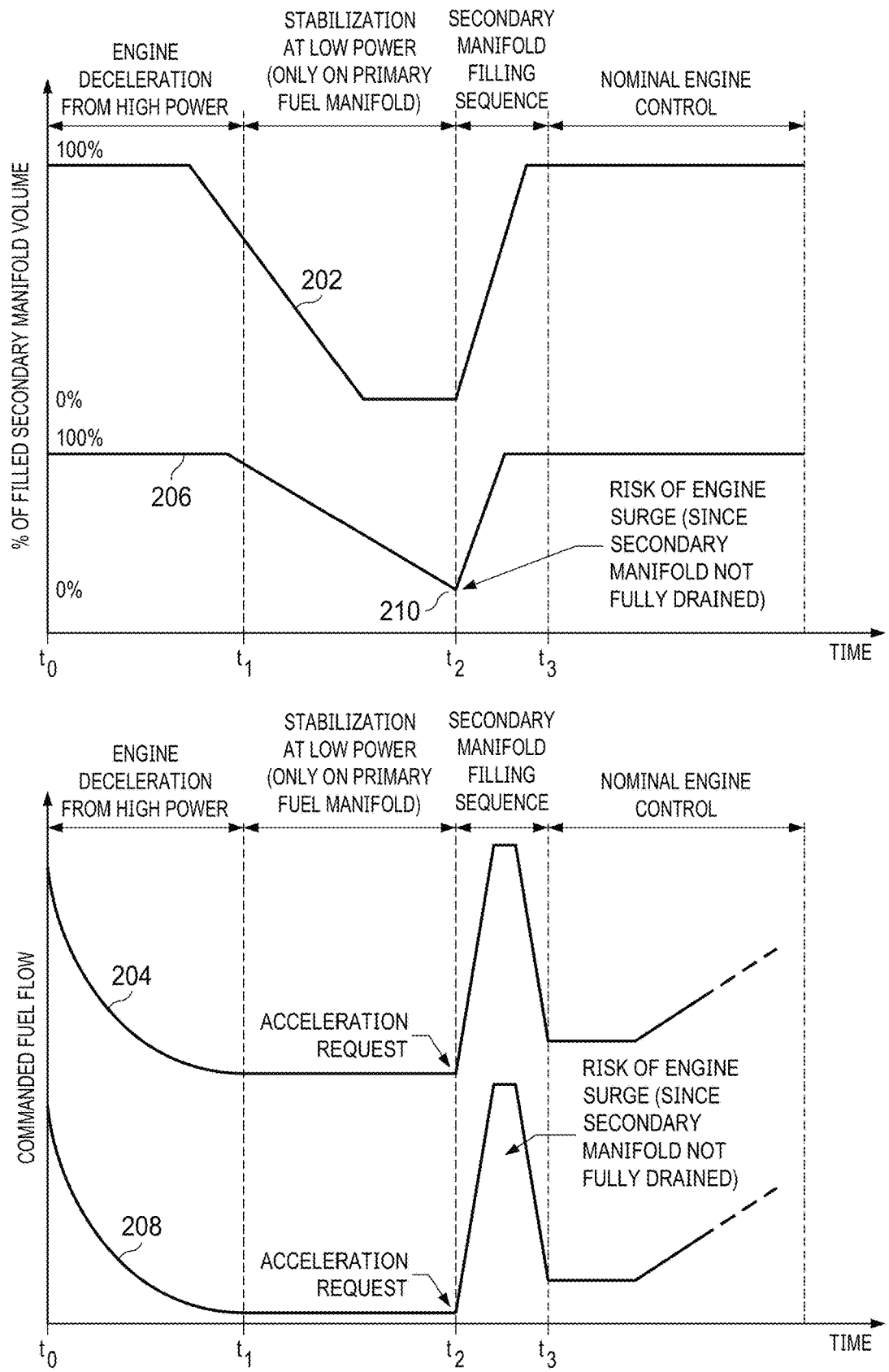
FIG. 2 illustrates an engine deceleration and manifold filling sequence for a gas turbine engine that has a completely drained secondary manifold and partially drained secondary manifold.

Referring now to FIG. 2, there is illustrated the engine deceleration and manifold filling sequence for a drained secondary manifold and a partially drained secondary manifold. FIG. 2 illustrates the percentage of the secondary manifold 104 that is filled at 202 from high-power to stabilization at low power below the secondary draining point. From time $T_0$ to time $T_1$, the engine is decelerating from high-power. From time $T_1$ to time $T_2$, the engine is stabilizing at low power. From time $T_2$ to time $T_3$, the secondary manifold filling sequence is illustrated when engine power is increased. And at time $T_3$ onward indicates normal engine control. The line 202 represents the percentage volume of the secondary manifold that is filled while line 204 illustrates the commanded fuel flow for the engine.

When acceleration is requested at time $T_2$, the manifold filling sequence is performed to quickly fill the secondary manifold 104 by increasing the commanded fuel flow and then decreasing the fuel flow between times $T_2$ and $T_3$. The manifold filling sequence is a fixed filling profile and comprises the current manner in which the secondary manifold 104 is refilled. At the end of the short secondary manifold 104 filling sequence, nominal engine control returns after time $T_3$. Line 206 shows the percentage of the secondary manifold filled by volume for an engine having a short stabilization before a re-acceleration is requested. Line 208 illustrates the commanded fuel flow for this shorter duration stabilization. The time-lapse below the secondary draining point 210 is not long enough to fully drain the secondary manifold 104. When the acceleration is requested at time $T_2$, the secondary manifold filling sequence initiates the commanded fuel flow profile. This causes a risk of surging the engine, because the secondary manifold 104 is not fully drained and a portion of the filling fuel maintained within the secondary manifold will be sent to the combustion chamber 118 instead of staying inside the secondary manifold. Thus, there is a need to prevent this occurrence.

Figure 3:
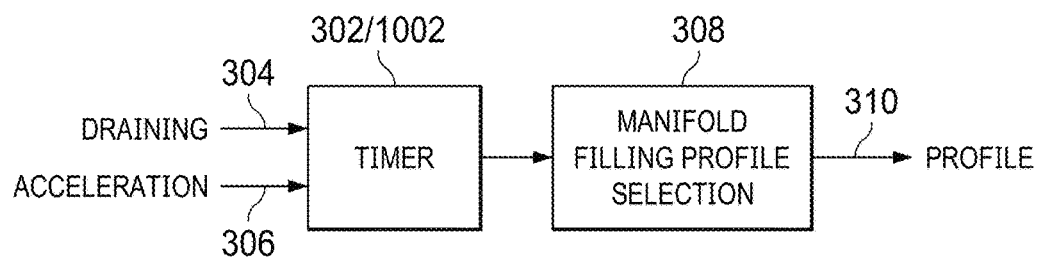
FIG. 3 illustrates a functional block diagram of an adaptive secondary manifold selection process.

Referring now to FIG. 3, there is illustrated a functional block diagram of a manner for adaptively selecting a secondary manifold filling profile. An elapsed draining timer 302 monitors the point at which draining of the secondary manifold 104 begins via input 304 and the time a new acceleration request is received at the input 306. Indication of initiation of draining of the secondary manifold initiates operation of timer 302. Stoppage of the timer 302 occurs when a new engine acceleration request is received via input 306. The timer 302 provides the measured time between the initiation of draining and the new acceleration to a secondary manifold filling profile selection process 308. The secondary manifold filling profile selection process 308 may comprise hardware, software or a combination thereof for determining a filling profile 310 to be associated with a detected timer value. Between the beginning of draining and request for a further engine acceleration. The manifold filling profile selection process 308 may comprise an indexed tables where in particular timer values that are measured are associated with particular filling profiles. Alternatively, an equation could be used for the determination of the filling profile based upon the received draining time and acceleration time. The manifold filling profile selection process 308 outputs a filling profile 310 associated with the determined draining time.

The adaptive selection of the filling profile 310 is designed to adapt the manifold filling sequence for special engine operations where the engine is decelerating below the secondary manifold draining point during low power operation and stabilizes to this low-power point for a certain amount of time. A special operation zone occurs that requires fast manifold filling when an engine acceleration request is received before the secondary manifold 104 has fully drained. The system of FIG. 3 modulates the filling sequence in response to the variable draining time. Draining time is used as a proxy variable because there is no instrumentation on production engines to directly measure the manifold filled levels. As will be more fully discussed hereinbelow, other parameters may be used for selecting a particular secondary manifold filling profile in addition to draining time.

The control logic of FIG. 3 adapts the manifold filling profile 310 as a function of the elapsed secondary manifold draining time. If enough stabilization time has passed, the secondary manifold 104 is fully drained, and the engine can schedule the maximum manifold filling profile 310. If there is no stabilization time below the draining fuel flow, then no or minimum manifold filling profile 310 is scheduled to avoid over fueling and surging the engine. Interpolation can be used to shape the manifold filling profile 310 for in between stabilization times corresponding to in between draining volume in order to target exactly the missing volume of the secondary manifold volume during the manifold filling sequence.

Figure 4:
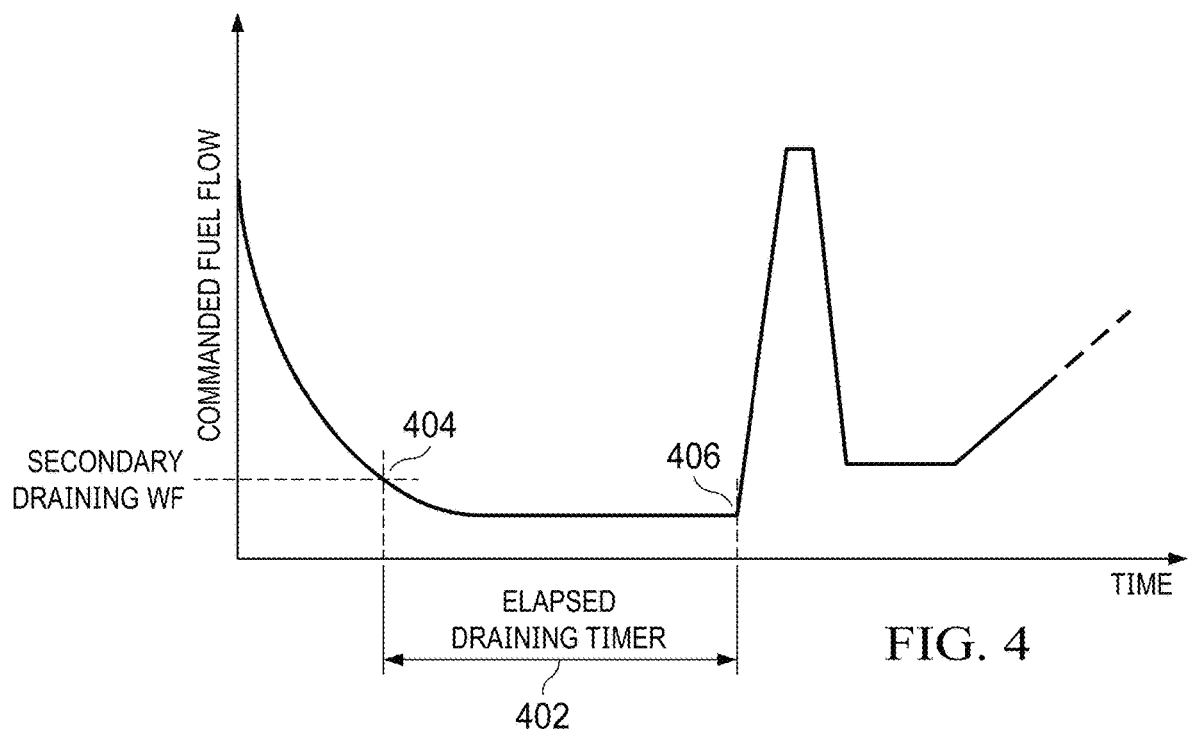
FIG. 4 illustrates a commanded fuel flow over time using an elapsed draining timer.

Referring now to FIG. 4, there is illustrated how the elapsed draining timer value 402 would be calculated. The timer is initiated at point 404 during engine deceleration when the commanded fuel flow falls below the secondary manifold draining value. The timer is then stopped at point 406 when an acceleration request is received and the timer value between point 404 and point 406 is used to select the appropriate manifold filling profile 310.

Figure 5:
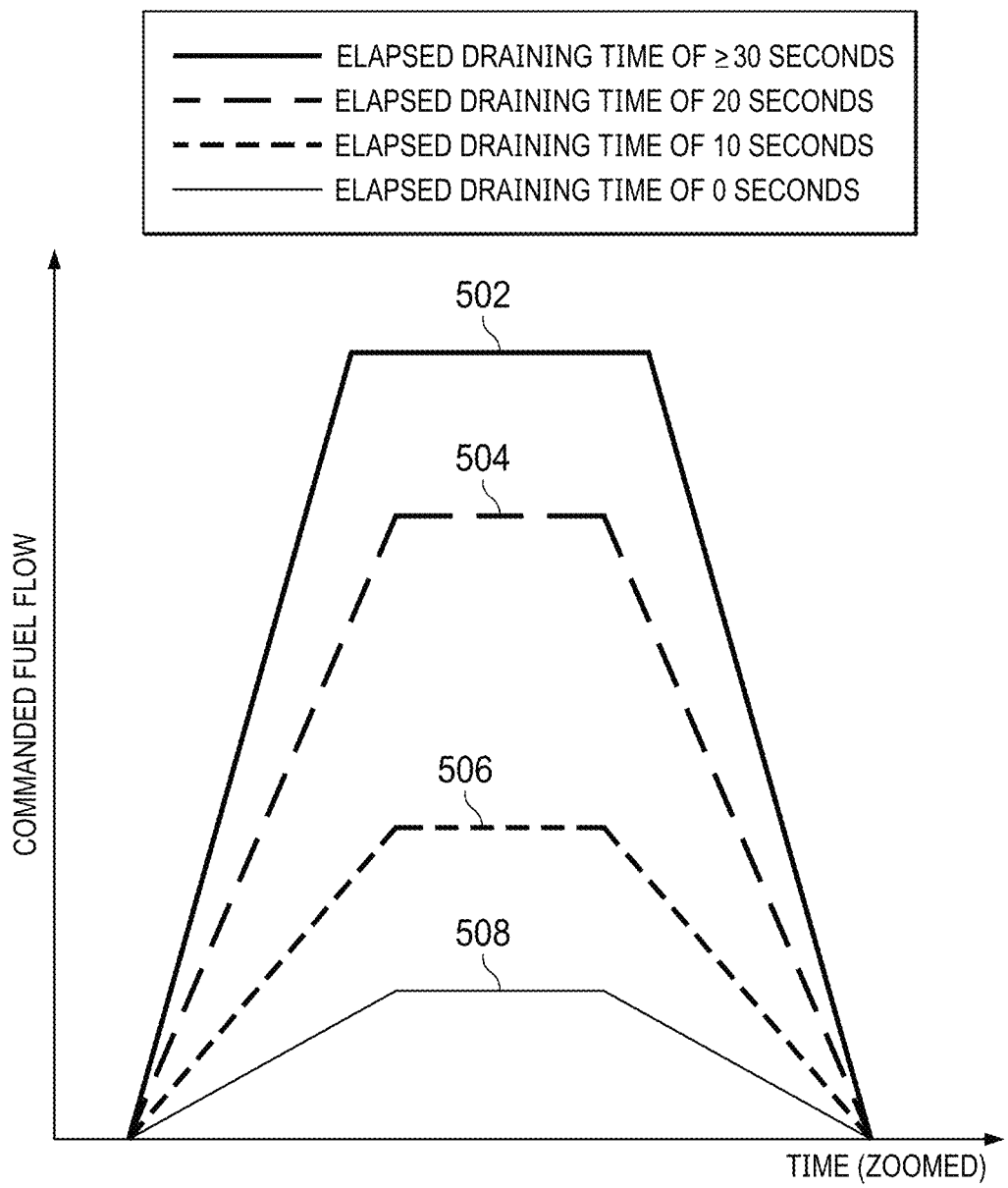
FIG. 5 illustrates a plurality of secondary manifold filling profiles having different amplitudes and fill rates responsive to various draining times.

FIG. 5 illustrates an example of various secondary manifold filling profiles 502-508 that may be selected as a function of the elapsed draining timer value 402. In this example, both the amplitude and the rate (rise and fall) of the fuel filling profile are modified as a function of time. Thus, profile 502 would be selected for an elapsed draining time of greater than 30 seconds, profile 504 would be selected for a draining time of 20 seconds, profile 506 would be selected for draining time of 10 seconds and profile 508 would be selected for a draining time of zero seconds. For particular times in between these times, the profiles may be interpolated.

Figure 6:
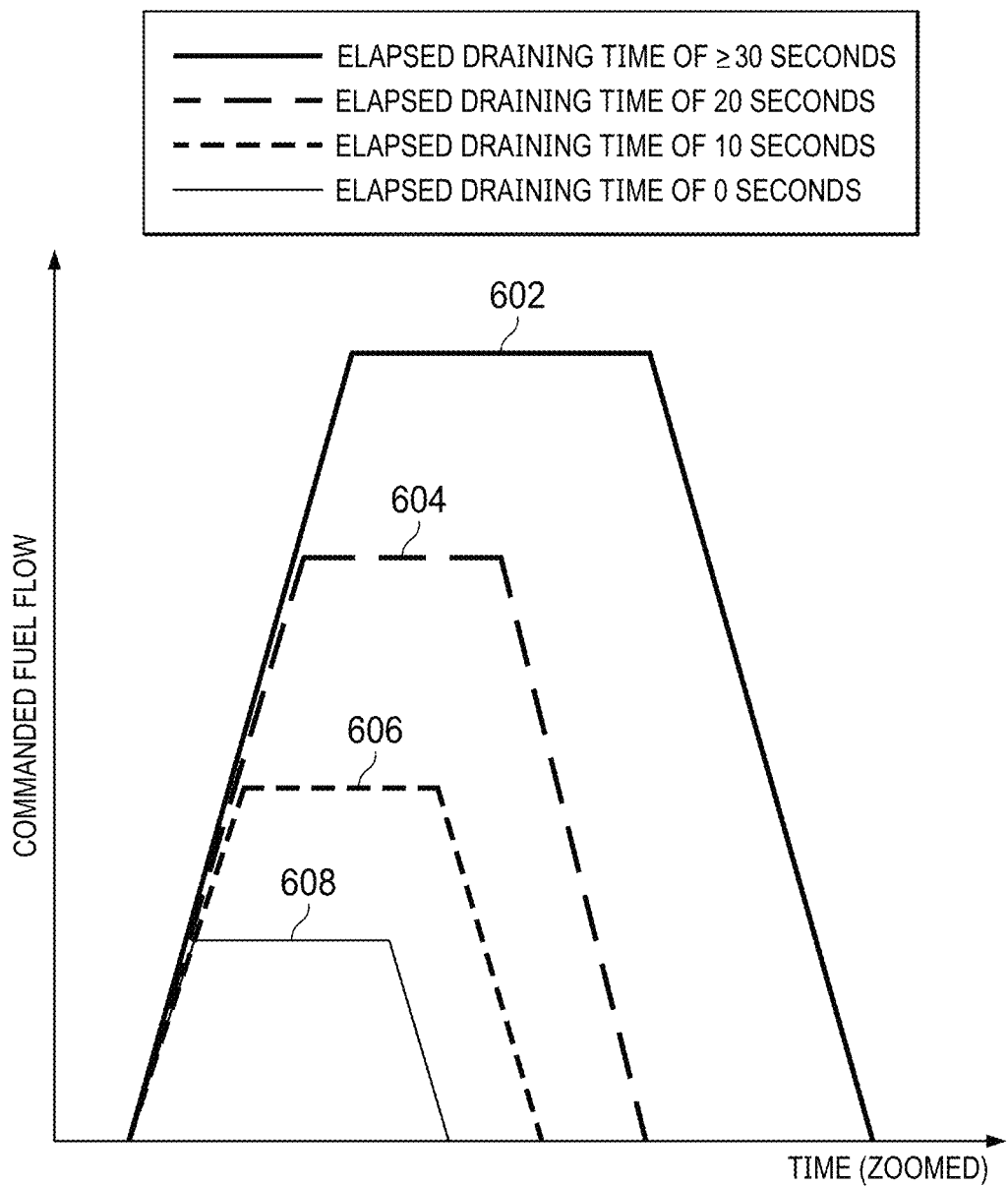
FIG. 6 illustrates a plurality of secondary manifold filling profiles having different amplitudes but a same fill rate responsive to various draining times.

Referring now to FIG. 6, there is illustrated an alternative example of filling profiles 602-608 wherein multiple profiles have the same filling rate and only modify the amplitude of the filling profiles 602-608. The amplitude of the profiles 602-608 are a function of the elapsed draining time and defined using draining timer values 402 characterization to target a profile that is just enough to fully refill the secondary manifold 104. For elapsed draining timer value 402 of zero, the manifold filling sequence may be entirely canceled. Thus, profile 602 would be selected for an elapsed draining time of greater than 30 seconds, profile 604 would be selected for a draining time of 20 seconds, profile 606 would be selected for draining time of 10 seconds and profile 608 would be selected for a draining time of zero seconds.

Figure 7:
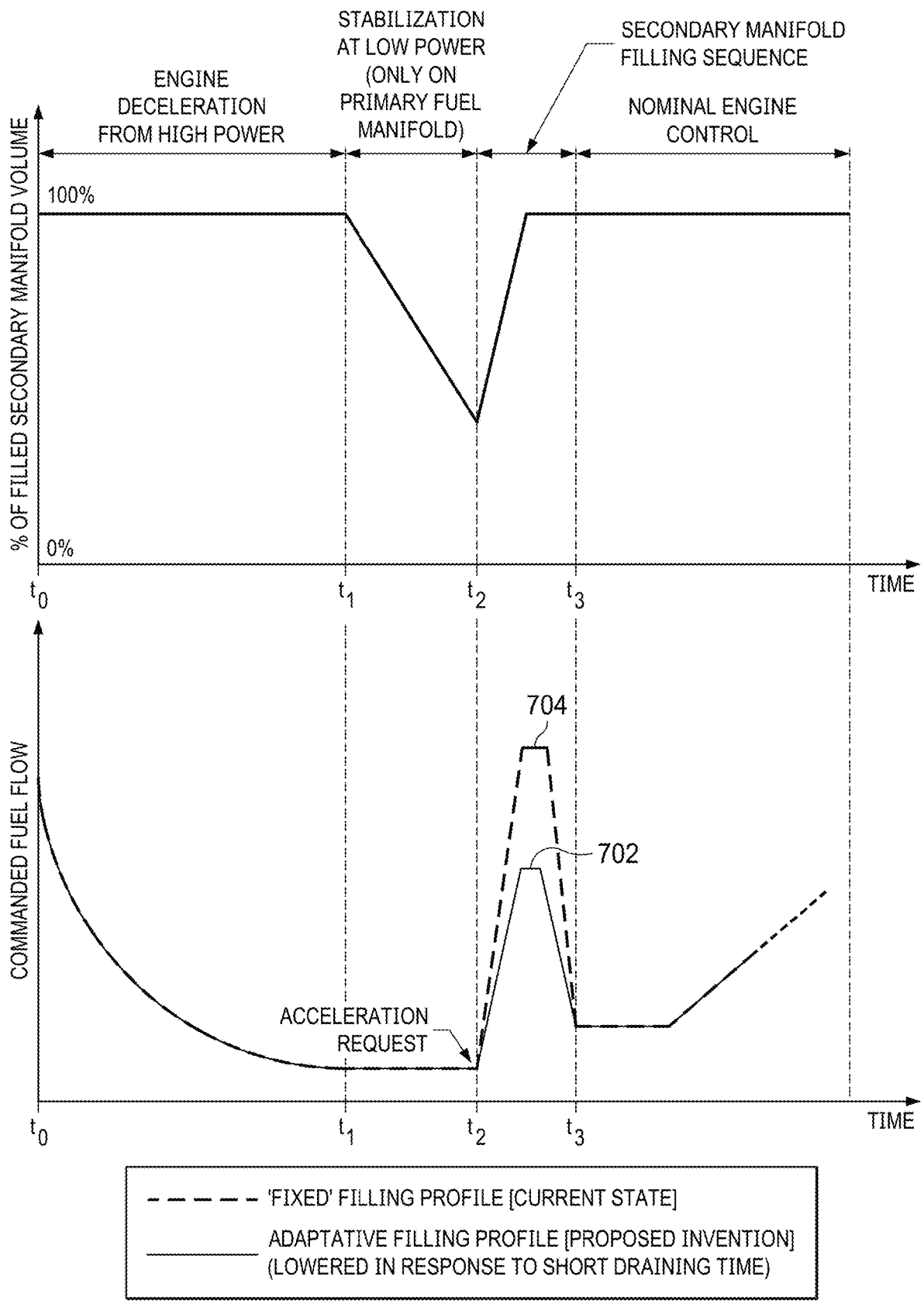
FIG. 7 illustrates an engine deceleration and manifold filling profile with short stabilization at low power.

FIG. 7 illustrates how the adaptively selected secondary manifold fuel filling profile 702 would modulate the filling profile for a short stabilization at low power versus a previous case of the current fixed profile 704. The short stabilization time between time $T_1$ and $T_2$ below the draining point would cause the elapsed draining timer value 402 to schedule a slower filling profile 702 to prevent over fueling and engine surge. For elapsed draining timer value 402 of zero, the manifold filling sequence may be entirely canceled.

Figure 8:
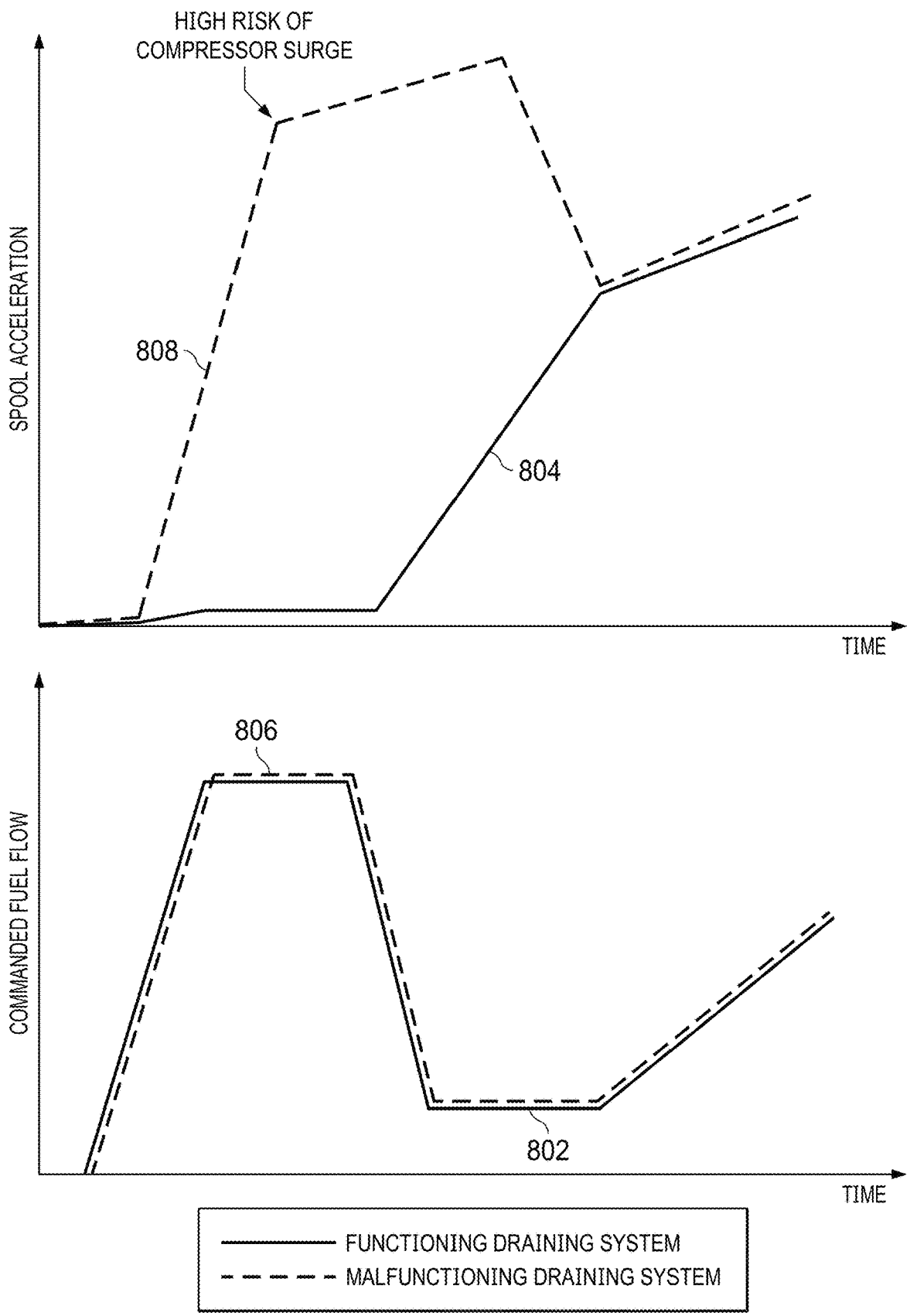
FIG. 8 illustrates a risk of surge in the case of a malfunctioning secondary manifold training system.

Referring now to FIG. 8, there is illustrated the risk of surge in the case of a malfunctioning draining system for the secondary manifold 104. A selectively adapted filling profile could be used with respect to filling of a secondary manifold 104 but still over fuel and surge the engine in a situation wherein the secondary manifold draining system was malfunctioning. For example, a stuck suction valve in the fuel flow divider 112 could cause this problem. The timer 302 would record sufficient draining time for a nominal case where the system is functional and would then schedule the adapted filling profile 310 accordingly, but without feedback about the actual filling level of the secondary manifold 104. Thus, the software would believe that enough time had elapsed and that it can schedule the maximum profile, but the secondary manifold 104 would still be full because the draining system is malfunctioning. The situation is illustrated in FIG. 8, wherein line 802 illustrates a filling profile with a functional draining system so that during filling there is no engine surge acceleration as indicated by line 804. This is due to the fact that fuel is not burned and only fills the secondary manifold 104. Line 806 illustrates the case of a malfunctioning system having the same schedule profile. However, the secondary manifold level has a more than expected fuel level due to the drainage malfunction, and the fuel is burnt within the combustion chamber 118 causing the spool to accelerate as indicated at 808 from over fueling of the engine and risking a surge.

Figure 9:
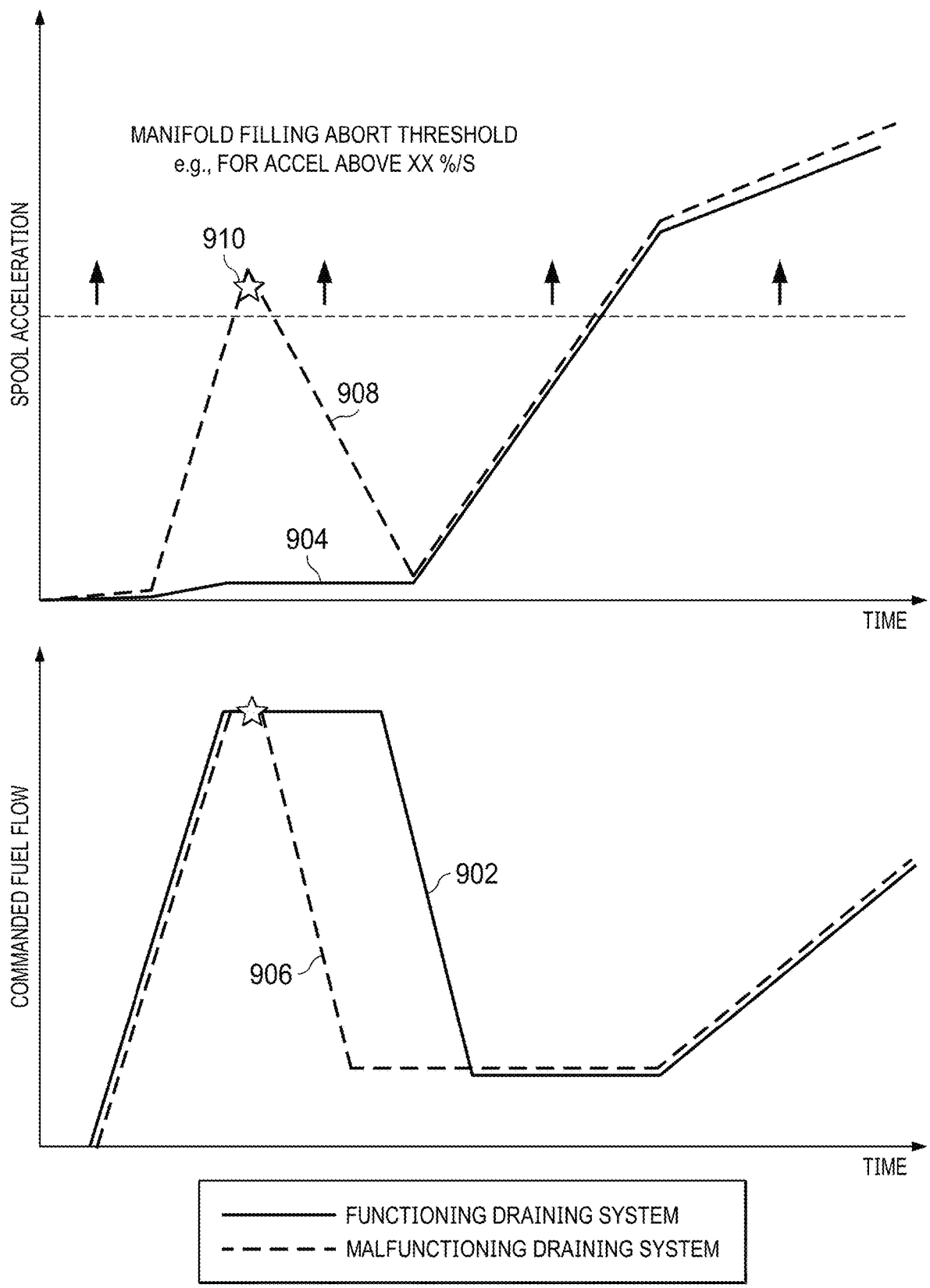
FIG. 9 illustrates an example of a secondary manifold filling profile having abort threshold protection.

This can be prevented as illustrated in FIG. 9 by aborting the secondary manifold filling sequence and returning the engine to nominal engine control if the spool acceleration 908 goes higher than a threshold level 910 during the filling sequence. Within FIG. 9, we can see that the spool acceleration 908 in the malfunctioning draining system and the spool acceleration 904 in the functioning draining system both later cross the threshold level 910 but at this point, the system is no longer operating in the manifold filling mode but in nominal engine control mode. Thus, for a normally functioning drain system, the commanded fuel flow 902 proceeds in the normal function as the spool acceleration 904 does not exceed the defined threshold level 910. However, for a malfunctioning draining system, when the spool acceleration 908 exceeds the threshold level 910, the commanded fuel flow 906 drops back down to a low power level. Any other parameter representative of combustion could be used instead of spool acceleration (i.e. speed increased Delta, P3 increased Delta, temperature downstream increase, etc.). Additionally, the aborting sequence while useful with the adaptively selective profile described hereinabove could also be used with the fixed standard profile described with respect to FIG. 2.

Figure 10:
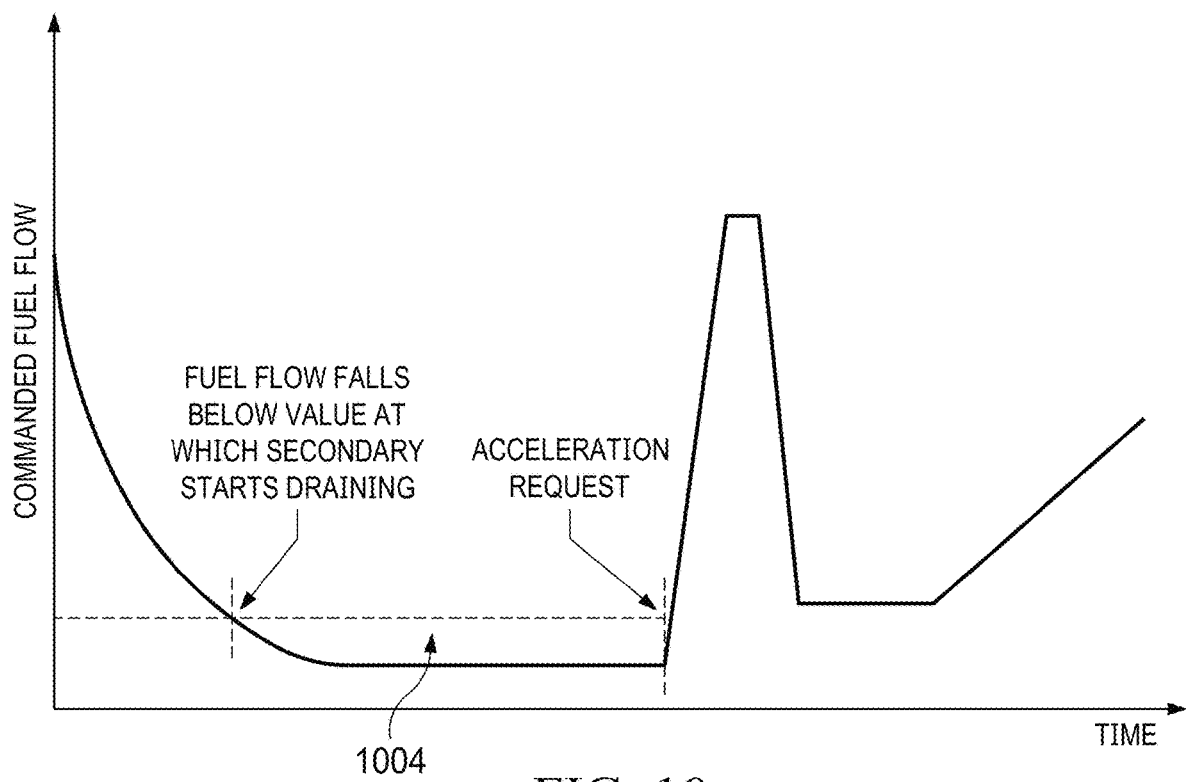
FIG. 10 illustrates a commanded fuel flow over time using an integrator area.

Referring now to FIG. 10, rather than using a timer for when fuel flow falls below the draining fuel flow, an integrator could instead be used. In this embodiment, the timer 302 of FIG. 3 would be substituted for an integrator 1002. The integrator 1002 would accumulate the difference between the draining fuel flow and the actual commanded fuel flow to determine the integrator area 1004 between at the time the fuel flow falls below the value at which secondary manifold starts draining and the acceleration request is received. The integrator area 1004 is between the commanded fuel flow and the draining fuel flow. This will be directly linked to a draining percentage and the manifold filling profile can then be selected using this integrator area 1004 instead of the timer 302.

The manifold filling sequence could in addition to being a function of elapsed draining time and/or an integrator, use the a function of P3. More generally, the filling could be corrected, or a function of any parameters deemed to influence the draining rate such as ambient parameters, fuel temperature/pressure, etc. The filling profile 310 shape and magnitude may be scheduled by an onboard modeling (e.g., in EEC/FADEC) that models the drain volume of the secondary manifold 104 based on any relevant parameter.

Figure 11:
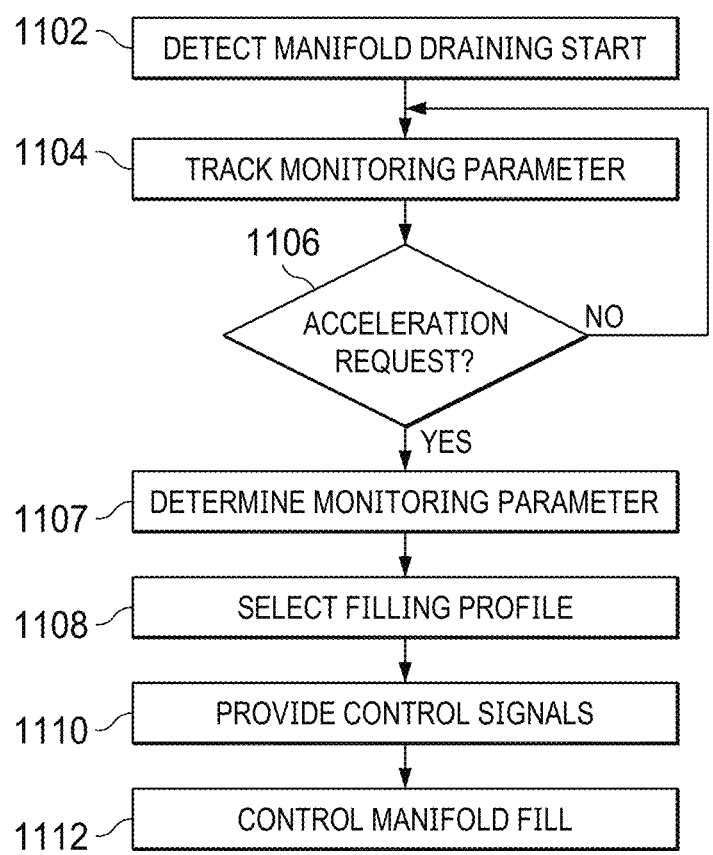
FIG. 11 illustrates a flow diagram of the method for adaptively selecting a filling profile.

Referring now to FIG. 11, there is illustrated a flow diagram of the method for adaptively selecting a secondary fuel manifold filling profile according to the present disclosure. The fuel control system initially detects that the secondary manifold 104 has begun draining at step 1102. The monitoring parameter associated with the secondary manifold filling profile selection is begins tracking at step 1104. This can be either the draining time, draining integrator or other parameters discussed hereinabove. Inquiry step 1106 determines if there has been an acceleration request for the gas turbine engine and if not, continues to monitor the parameter at step 1104. Once inquiry step 1106 detects an acceleration request, the monitoring parameter is determined at step 1107 based on the starting draining time and the acceleration request. The determined monitoring parameter is then used to select a filling profile at step 1108. The selected filling profile is used to provide control signals to the control system at step 1110, and the secondary manifold filling is controlled at step 1112 using the provided filling profile.

While the above discussions have been made with respect to a gas turbine engine including two manifolds, other engine models having three or more manifolds could also apply the adaptively selectable filling profile for any of the number of manifolds in these other engine types. The system is equally applicable to any system having a manifold that needs to be filled quickly.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a combustion chamber of a gas turbine engine;
a primary manifold for injecting fuel into the combustion chamber via a first plurality of nozzles;
a secondary manifold for injection fuel into the combustion chamber via a second plurality of nozzles;
a fuel control system for providing fuel flow to the primary manifold and to the secondary manifold;
wherein the fuel control system:
determines at least one control parameter responsive to a first point at which a fuel flow level causes the secondary manifold to start draining and a second point at which an acceleration request is made; and
selects one of a plurality of secondary manifold filling profiles responsive to the at least one control parameter.

2. The apparatus of claim 1, wherein the fuel control system further:
detects when the fuel flow level causes the secondary manifold to start draining;
detects when the acceleration request is made;
determines a time between when the fuel flow level causes the secondary manifold to start draining and when the acceleration request is made; and
selects the one of the plurality of secondary manifold filling profiles responsive to the time.

3. The apparatus of claim 1, wherein the fuel control system further:
detects when the fuel flow level causes the secondary manifold to start draining;
detects when the acceleration request is made;
determines an integrator area between when the fuel flow level causes the secondary manifold to start draining and when the acceleration request is made; and
selects the one of the plurality of secondary manifold filling profiles responsive to the integrator area.

4. The apparatus of claim 1, wherein the plurality of secondary manifold filling profiles each have a different amplitude and a different fuel rate.

5. The apparatus of claim 1, wherein the plurality of secondary manifold filling profiles each have a different amplitude and a same fuel rate.

6. The apparatus of claim 1, wherein the fuel control system further:
monitors a spool acceleration of the gas turbine engine during execution of the one of the plurality of secondary manifold filling profiles;
determines if the spool acceleration of the gas turbine engine exceeds a threshold level; and
aborts the one of the plurality of secondary manifold filling profiles responsive to a determination that the spool acceleration of the gas turbine engine exceeds the threshold level.

7. The apparatus of claim 1, wherein the fuel control system further dynamically generates the one of the plurality of secondary manifold filling profiles using an equation.

8. The apparatus of claim 1, wherein the plurality of secondary manifold filling profiles are each associated with a predetermined value of the at least one control parameter.

9. A method for controlling filling of a secondary manifold of a gas turbine engine comprising:
providing fuel flow to a primary manifold and to the secondary manifold of the gas turbine engine using a fuel control system;
determining at least one control parameter responsive to a first point at which a fuel flow level causes the secondary manifold to start draining and a second point at which an acceleration request of the gas turbine engine is made; and
selecting one of a plurality of secondary manifold filling profiles responsive to the at least one control parameter.

10. The method of claim 9, wherein the step of determining further comprises:
detecting when the fuel flow level causes the secondary manifold to start draining;
detecting when the acceleration request is made; and
determining a time between when the fuel flow level causes the secondary manifold to start draining and when the acceleration request is made.

11. The method of claim 10 further comprising selecting the one of the plurality of secondary manifold filling profiles responsive to the time.

12. The method of claim 9, wherein the step of determining further comprises:
detecting when the fuel flow level causes the secondary manifold to start draining;
detecting when the acceleration request is made; and
determining an integrator area between when the fuel flow level causes the secondary manifold to start draining and when the acceleration request is made.

13. The method of claim 12 further comprising selecting the one of the plurality of secondary manifold filling profiles responsive to the integrator area.

14. The method of claim 9 further comprising:
monitoring a spool acceleration of the gas turbine engine during execution of the one of the plurality of secondary manifold filling profiles;
determining if the spool acceleration of the gas turbine engine exceeds a threshold level; and
aborting the selected one of the plurality of secondary manifold filling profiles responsive to a determination that the spool acceleration of the gas turbine engine exceeds the threshold level.

15. The method of claim 9, wherein the step of selecting further comprises dynamically generating the one of the plurality of secondary manifold filling profiles using an equation.

16. The method of claim 9, wherein the step of selecting further comprises associating each of the plurality of secondary manifold filling profiles with a predetermined value of the at least one control parameter.

17. An apparatus comprising:
a combustion chamber of a gas turbine engine;
a primary manifold for injecting fuel into the combustion chamber via a first plurality of nozzles;
a secondary manifold for injection fuel into the combustion chamber via a second plurality of nozzles;
a fuel control system for providing fuel flow to the primary manifold and to the secondary manifold, wherein the fuel control system further comprises:
a timer associated with the fuel control system;
a plurality of secondary manifold filling profiles each associated with a predetermined time value;

wherein the fuel control system:
   initiates the timer when a fuel flow level causes the secondary manifold to start draining;
   stops the timer when an acceleration request is made;
   determines a time value between when the fuel flow level causes the secondary manifold to start draining and when the acceleration request is made responsive to a time measured by the timer; and
   selects one of a plurality of secondary manifold filling profiles responsive to the time value.

18. The apparatus of claim 17, wherein the plurality of secondary manifold filling profiles each have a different amplitude and a different fuel rate.

19. The apparatus of claim 17, wherein the plurality of secondary manifold filling profiles each have a different amplitude and a same fuel rate.

20. The apparatus of claim 17, wherein the fuel control system further:
   monitors a spool acceleration of the gas turbine engine during execution of the one of the plurality of secondary manifold filling profiles;
   determines if the spool acceleration of the gas turbine engine exceeds a threshold level; and
   aborts the one of the plurality of secondary manifold filling profiles responsive to a determination that the spool acceleration of the gas turbine engine exceeds the threshold level.

* * * * *